United States Patent
Ishimasa (10) Patent No.: US 10,901,169 B2
(45) Date of Patent: Jan. 26, 2021

(54) INTERCHANGEABLE LENS AND CAMERA SYSTEM

(71) Applicant: CANON KABUSHIKI KAISHA, Tokyo (JP)

(72) Inventor: Toru Ishimasa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 16/258,932

(22) Filed: Jan. 28, 2019

(65) Prior Publication Data
US 2019/0235198 A1    Aug. 1, 2019

(30) Foreign Application Priority Data

Jan. 30, 2018 (JP) .................. 2018-013809

(51) Int. Cl.
*G02B 7/04* (2006.01)
*G03B 17/14* (2006.01)
*H04N 5/225* (2006.01)
*G02B 7/02* (2006.01)

(52) U.S. Cl.
CPC .............. *G02B 7/04* (2013.01); *G02B 7/022* (2013.01); *G03B 17/14* (2013.01); *H04N 5/2254* (2013.01); *G02B 7/021* (2013.01)

(58) Field of Classification Search
CPC .......... G02B 7/04; G02B 7/022; G02B 7/021; G03B 17/14; H04N 5/2254
USPC .................. 359/642, 811, 819, 822, 823
See application file for complete search history.

(56) References Cited

U.S. PATENT DOCUMENTS 10,571,780 B2 *  2/2020  Kondo ............... H04N 5/2257
10,775,585 B2 *  9/2020  Sasaki ............... H04N 5/2253

FOREIGN PATENT DOCUMENTS

JP           2003015010 A      1/2003

* cited by examiner

*Primary Examiner* — Tuyen Tra
(74) *Attorney, Agent, or Firm* — Rossi, Kimms & McDowell LLP

(57) ABSTRACT

An interchangeable lens in which a tilt of an optical axis of a shooting optical system and a projection lens system can be easily adjusted. An interchangeable lens comprising a lens barrel portion holding a lens group; a lens mount detachably coupled to a camera main body; and a spacer sandwiched between the lens barrel portion and the lens mount. The spacer has, in a circumferential direction of the interchangeable lens, first seat surfaces protruding in the optical axis direction at one surface thereof, and has, in the circumferential direction, second seat surfaces protruding in the optical axis direction at the other surface thereof. One seat surfaces of the first seat surfaces and the second seat surfaces are disposed with different heights such that a surface defined by the second seat surfaces has an angle with respect to a surface defined by the first seat surfaces.

8 Claims, 9 Drawing Sheets

INTERCHANGEABLE LENS AND CAMERA SYSTEM

BACKGROUND OF THE INVENTION

Field of the Invention

The present invention relates to an interchangeable lens and a camera system equipped with the interchangeable lens.

Description of the Related Art

A camera system which detachably attaches an interchangeable lens to a camera main body usually uses a structure which includes a lens mount adopting a bayonet structure as a coupling unit between the camera main body and the interchangeable lens. This interchangeable lens adjusts the tilt of an optical axis caused by a manufacturing error of a lens barrel part to a predetermined tilt by interposing a washer of a predetermined thickness between the interchangeable lens and the lens mount.

However, according to Japanese Laid-Open Patent Publication (kokai) No. 2003-15010, a plurality of washers of different thicknesses need to be prepared, and therefore efficiency is poor, an operation of assembling the washers is highly difficult and the operability is poor.

SUMMARY OF THE INVENTION

The present invention provides an interchangeable lens in which a tilt of an optical axis of a shooting optical system and a projection lens system can be easily adjusted, and a camera system equipped with the interchangeable lens.

An image pickup apparatus according to the present invention provides an interchangeable lens comprising: a lens barrel portion configured to hold a lens group; a lens mount detachably coupled to a camera main body; and a spacer sandwiched between the lens barrel portion and the lens mount in an optical axis direction of the interchangeable lens, wherein the spacer having, in a circumferential direction of the interchangeable lens, a plurality of first seat surfaces protruding in the optical axis direction, respectively, at one surface thereof with respect to the optical axis direction, and having, in the circumferential direction, a plurality of second seat surfaces protruding in the optical axis direction, respectively, at the other surface thereof with respect to the optical axis direction, and one plurality of seat surfaces of the plurality of first seat surfaces and the plurality of second seat surfaces are disposed with different heights in the optical axis direction such that a surface defined by the plurality of second seat surfaces has an angle with respect to a surface defined by the plurality of first seat surfaces.

According to the present invention, it is possible to obtain an image of good visibility irrespectively of a state of a zooming operation under dark environment.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

First Embodiment

Figure 1:
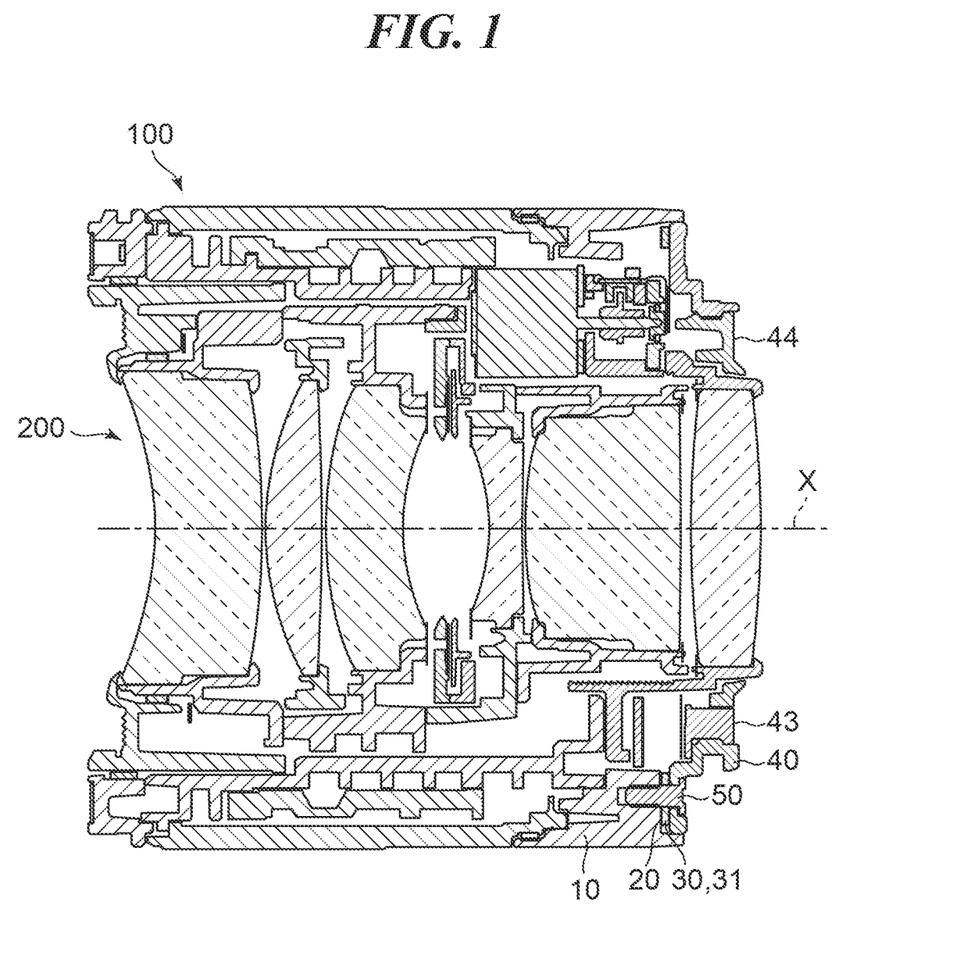
FIG. 1 is a cross-sectional view of an interchangeable lens according to a first embodiment of the present invention during infinite distance shooting.

FIG. 1 is a cross-sectional view of an interchangeable lens according to the first embodiment of the present invention during infinite distance shooting. In FIG. 1, an interchangeable lens 100 according to the present embodiment includes a holding barrel which holds a lens group 200 including a focus lens group, a fixed barrel 10, a mount seat 20, a flat spacer 30 (or a tilt spacer 31), a mount 40, a connector 43, a back cover 44 and screws 50. The holding barrel and the fixed barrel 10 constitute a lens barrel part of the interchangeable lens 100. The interchangeable lens 100 according to the present embodiment is detachably attached to a camera main body 300 (see FIG. 4) and constitutes a camera system.

Figure 2:
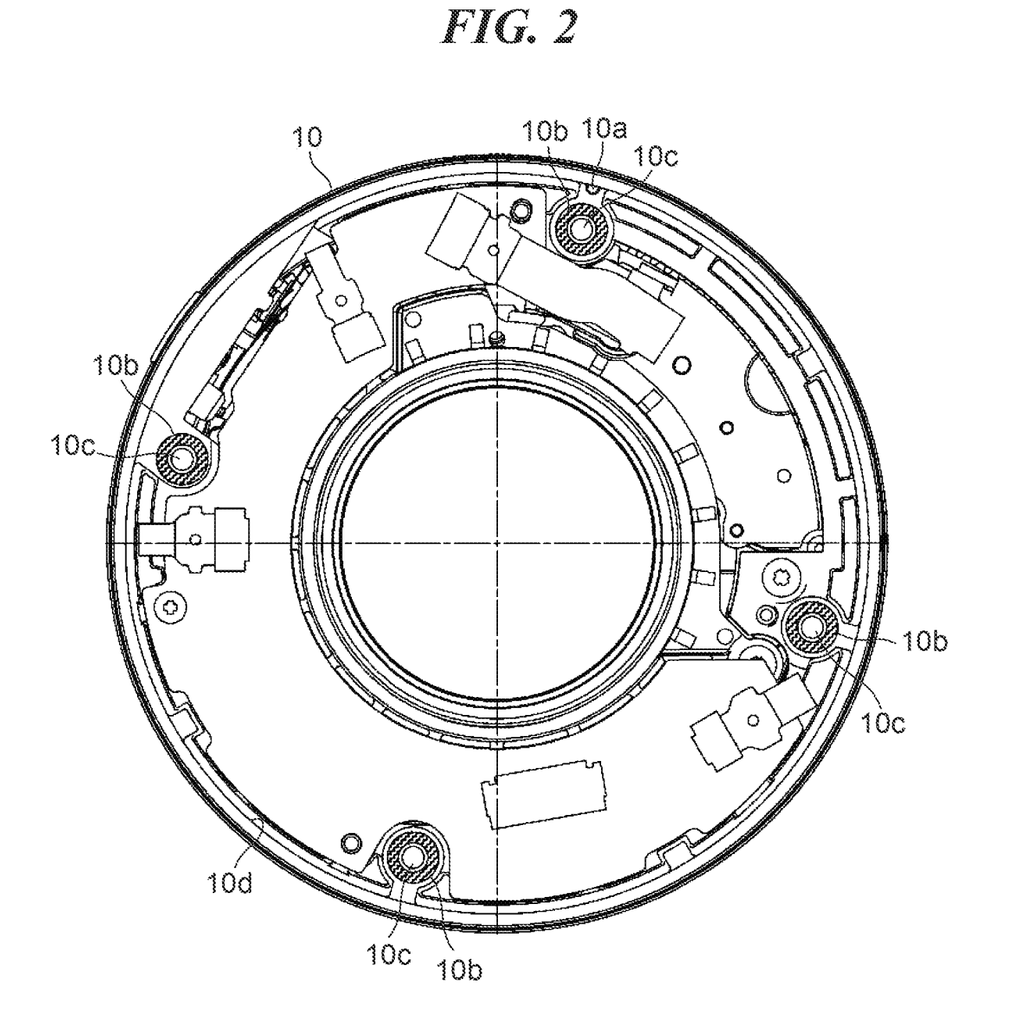
FIG. 2 is a view showing a fixed barrel of the interchangeable lens viewed from a side of a lens mount in an optical axis direction.
Figure 3:
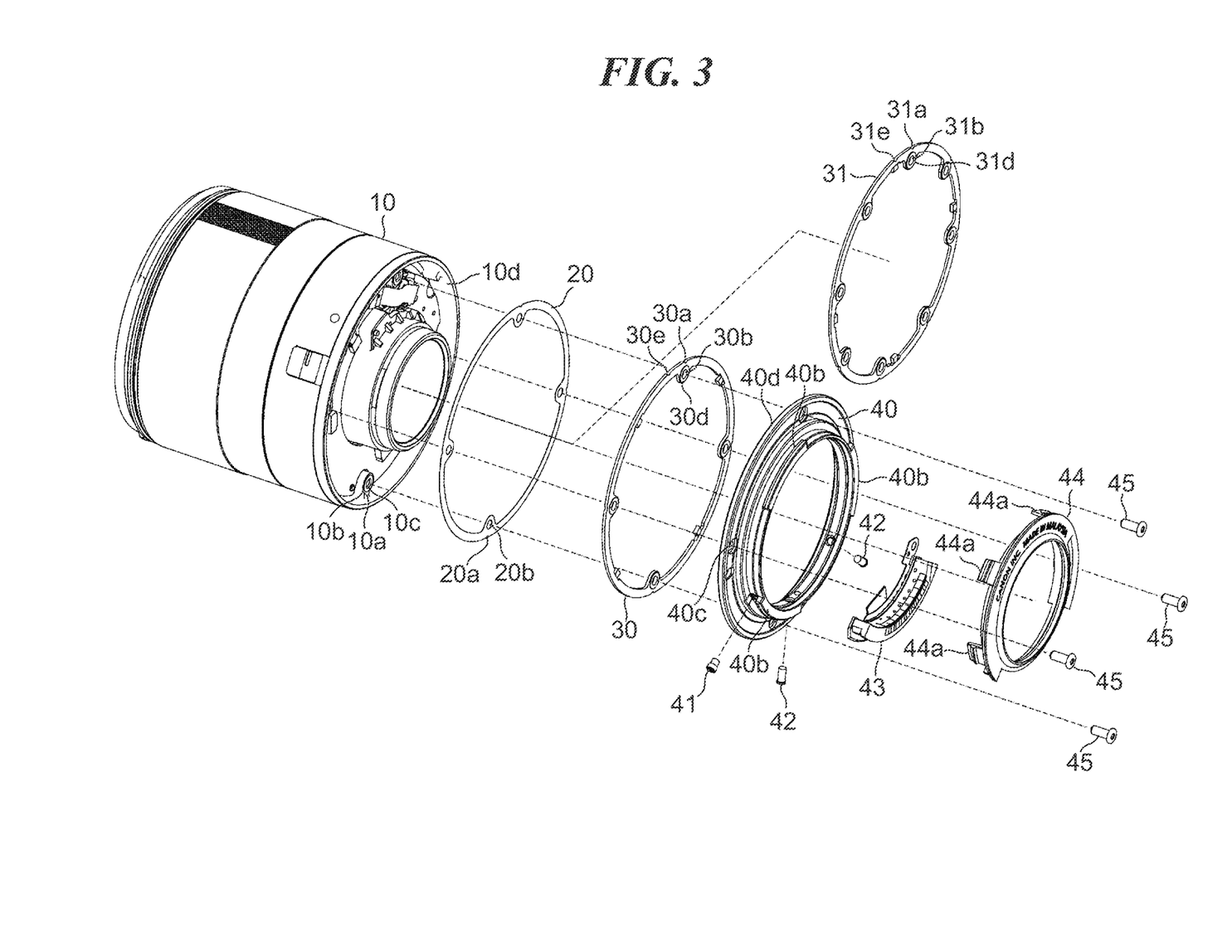
FIG. 3 is an exploded perspective view showing the vicinity of the lens mount of the interchangeable lens.

FIG. 2 is a view showing the fixed barrel 10 from a side of the lens mount 40 in a direction of an optical axis x. FIG. 3 is an exploded perspective view showing the vicinity of the lens mount 40 of the interchangeable lens 100. As shown in FIG. 3, the fixed barrel 10 is provided with positioning portions 10a for the mount seat 20 and the flat spacer 30 (or the tilt spacer 31), reception surfaces 10b of the mount seat 20 and the mount 40, and a fitting part 10d which radially fits to the mount 40.

Furthermore, the reception surfaces 10b of the fixed barrel 10 are disposed at four portions at substantially regular intervals in the circumferential direction, and are provided with screw holes 10c for fixing the lens mount 40 (hereinafter referred to as "the mount 40") at the center portions of the reception surfaces 10b by the four screws 50. The thickness of the mount seat 20 is set so as to satisfy back focus adjustment calculated by optical design. As shown in FIG. 3, the mount seat 20 is positioned with respect to the fixed barrel 10 by aligning the positioning portions 10a of the fixed barrel 10 (see FIG. 2) to positioning portions 20a of the mount seat 20.

The flat spacer 30 is provided with positioning portions 30a for the fixed barrel 10, and through-holes 30b through which the screws 50 penetrate and which meet the screw holes 10c. Furthermore, the flat spacer 30 is provided with reception surfaces 30c (see FIG. 5B) which come into contact with the fixed barrel 10 via the mount seat 20 coaxially with the through-holes 30b, and reception surfaces 30d which come into contact with the mount 40. The flat spacer 30 is positioned with respect to the fixed barrel 10 by aligning the positioning portions 30a to the positioning portions 10a of the fixed barrel 10.

The tilt spacer 31 is provided with positioning portions 31a for the fixed barrel 10, and through-holes 31b through which the screws 50 penetrate and which meet the screw holes 10c. Furthermore, the tilt spacer 31 is provided with reception surfaces 31c (first seat surfaces) (see FIG. 7B) which come into contact with the fixed barrel 10 via the mount seat 20 coaxially with the through-holes 31b, and reception surfaces 31d (second seat surface) which come into contact with the mount 40.

The through-holes 31b of the tilt spacer 31 are formed at eight portions in total including four portions at the same phases as the screw holes 10c, and four portions of positions with the phases shifted by 45 degrees from the screw holes 10c. The positioning portions 31a for the fixed barrel 10 are also formed at eight portions likewise. The tilt spacer 31 is positioned with respect to the fixed barrel 10 by aligning the positioning portions 31a to the positioning portions 10a of the fixed barrel 10. One of the flat spacer 30 and the tilt spacer 31 is assembled during overall tilt adjustment of the interchangeable lens 100, yet will be described in detail below.

The mount 40 is provided with bayonet claws 40b at three portions at substantially regular intervals in the circumferential direction, and is provided with through-holes 40c through which the screws 50 penetrate and which meet the screw holes 10c. A surface of the mount 40 facing the fixed barrel 10 is provided with a contact surface 40a which comes into contact with the flat spacer 30 (or tilt spacer 31). Furthermore, the connector 43 is fixed to the mount 40 by screws 42, and the back cover 44 is fixed to the mount 40 by claws 44a.

Figure 4:
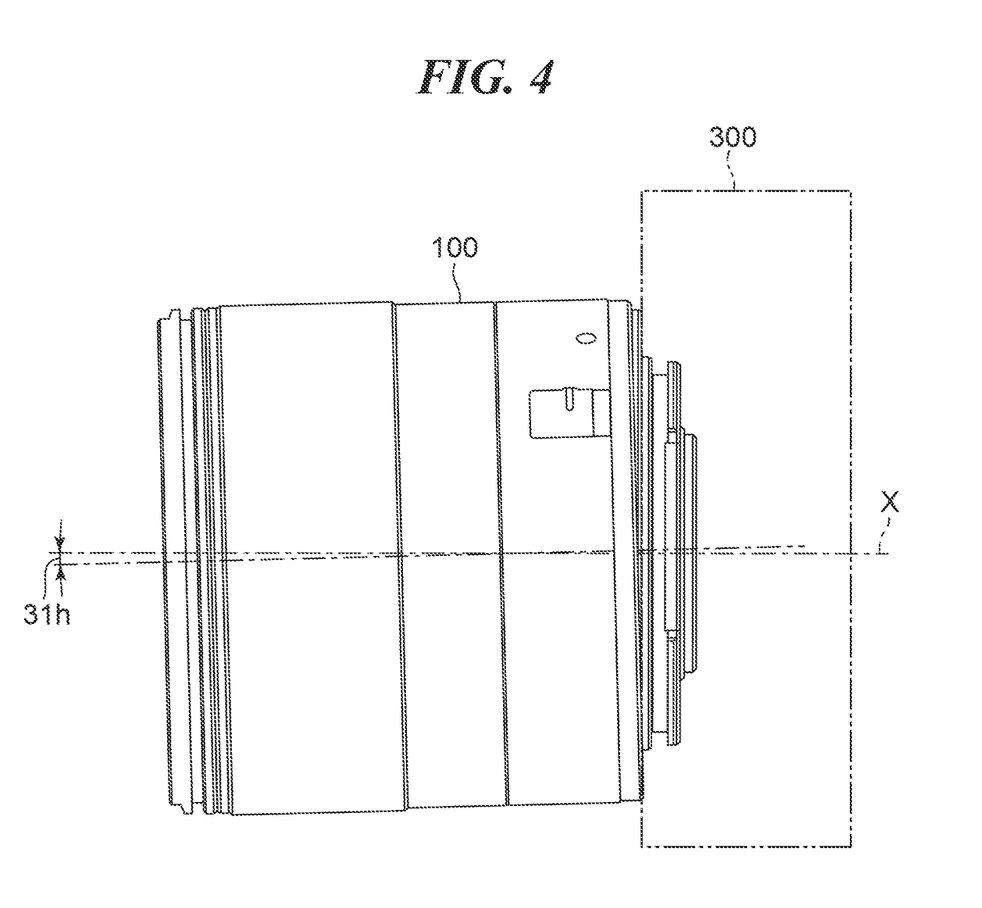
FIG. 4 is a view showing a state where the interchangeable lens is attached to a camera main body.

FIG. 4 is a view showing a state where the interchangeable lens 100 is attached to the camera main body 300. The camera main body 300 includes a camera mount (not shown), and the camera mount is provided with bayonets (not shown) which meet the bayonet claws 40b of the mount 40 of the interchangeable lens 100 at three portions at substantially regular intervals in the circumferential direction. By fitting the bayonet claws 40b of the mount 40 to the bayonets disposed on the camera mount of the camera main body 300, the interchangeable lens 100 and the camera main body 300 are coupled.

With respect to the mount seat 20 and the flat spacer 30, the screws 50 which penetrate the through-holes 40c of the mount 40 pass through the through-holes 30b of the flat spacer 30 and the through-holes 20b of the mount seat 20, and are fastened to the screw holes 10c of the fixed barrel 10.

Alternatively, with respect to the mount seat 20 and the tilt spacer 31, the screws 50 which penetrate the through-holes 40c of the mount 40 pass through the through-holes 31b of the tilt spacer 31 and the through-holes 20b of the mount seat 20, and are fastened to the screw holes 10c of the fixed barrel 10.

Thus, the mount seat 20 and the flat spacer 30 (or the tilt spacer 31) are sandwiched between the mount 40 and the fixed barrel 10 in the optical axis direction. It should be noted that, by fastening the fixed barrel 10 and the mount 40 by the screws 50 in a state where the fitting part 40d of the mount 40 is fitted to the fitting part 10d of the fixed barrel 10, the centers of the fixed barrel 10 and the mount 40 match with each other.

In this regard, back focus adjustment and overall tilt adjustment are performed as final adjustment on the interchangeable lens 100. The back focus adjustment and the overall tilt adjustment correct an infinity defocus caused by parts manufacturing errors of a lens and a lens barrel, i.e., a shift from a design value for a distance from a predetermined surface of the interchangeable lens to a focal plane when the focus is adjusted to an object at infinity, and an overall lens tilt.

First, conventional back focus adjustment will be described. According to the conventional back focus adjustment method, an interchangeable lens in a state where a mount is assembled in a fixed barrel is set to an infinity adjuster, and is disposed at a design distance when a focus lens group is focused on an object at infinity. An image sensor (image formation plane) is moved forward and backward in the optical axis direction in this state to calculate a focal distance shift amount between the design value and a measurement value.

A mount contact surface is cut based on the focal distance shift amount calculated by the infinity adjuster to adjust a back focus to a predetermined value. A variation of a machining error of each lens or each part makes unknown whether the focal distance shifts in a direction to make the mount thick or a direction to make the mount thin. Hence, for a cutting amount of the mount contact surface, the shift amount of the back focus caused by a manufacturing error of each lens or a lens barrel is calculated in advance, and the mount is formed thicker than a shift value in the direction to make the mount thick. By this means, the mount is cut at all times irrespectively of the shift amount of the back focus, and is fitted and attached to the fixed barrel.

Thus, conventionally, when the back focus adjustment is performed, contact surfaces which receive a mount of a fixed barrel are provided in a direction perpendicular to the optical axis, and the mount contact surface is cut and adjusted based on a focal distance shift amount obtained from the measurement result of the infinity adjuster, or the contact surface of the fixed barrel is cut and adjusted. However, the conventional back focus adjustment requires man-hours for cutting the mount contact surfaces, and a risk such as cutting chips increases.

On the other hand, the conventional overall tilt adjustment method sets to a tilt adjuster an interchangeable lens for which the above back focus adjustment has been finished, measures whether or not tilts of an image sensor and a lens group are within predetermined values, and, when the measurement result is within a predetermined tilt amount, a process moves to the next process as is. When the measurement result exceeds the predetermined tilt amount, the interchangeable lens is detached from the tilt adjuster, and a washer having the thickness corresponding to the tilt amount obtained from the measurement result of the tilt adjuster is disposed at a predetermined position between the contact surfaces which receive the mount of the fixed barrel, and the mount contact surfaces.

In this regard, the contact surfaces which receive the mount of the fixed barrel are perpendicular to the optical axis. Therefore, by disposing the washer having the intended thickness at the predetermined position, the entire interchangeable lens tilts with respect to the mount contact surface in a direction calculated by the tilt adjuster. Thus, the tilts of the image sensor and the lens group are adjusted within the predetermined values. However, the conventional overall tilt adjustment needs to prepare a plurality of washers having the different thicknesses, and therefore an operation of disposing the washers is highly difficult and the operability is poor.

Next, the back focus adjustment according to the present embodiment will be described. According to a back focus adjustment method according to the present embodiment, the interchangeable lens 100 in a state where the mount seat 20, the flat spacer 30, and the mount 40 are fixed to the fixed barrel 10 by the screws 50 is set to an infinity adjuster. Furthermore, a focus lens group is disposed at a design distance in a case where the focus lens group is focused on the object at infinity, the image sensor (not shown) is moved forward and backward in the direction of the optical axis x, and the focal distance shift amount of the design value and the measurement value is calculated.

Next, the mount seat 20 is added or removed based on the focal distance shift amount calculated by the infinity adjuster. The thickness of the mount seat 20 is the thickness which is calculated by optical design as described above and is necessary for the back focus adjustment. A variation of a machining error of each lens or each part makes unknown whether the focal distance shifts in a direction to add the mount seat 20 or a direction to remove the mount seat 20. Hence, in this structure, the one mount seat 20 is disposed in a normal state, and is added or removed according to the measurement result, so that the back focus can be adjusted to a predetermined value.

Thus, according to the present embodiment, when the back focus adjustment of the interchangeable lens 100 is performed, the mount seat 20 is added or removed based on the focal distance shift amount obtained from the measurement result of the infinity adjuster to adjust the back focus.

Next, the overall tilt adjustment according the present embodiment will be described. According to the overall tilt adjustment method according to the present embodiment, the interchangeable lens 100 for which the above back focus adjustment has been finished is set to the tilt adjuster to measure whether or not the tilts of an image sensor and the lens group 200 are within the predetermined values. Furthermore, when the measurement result shows that the tilt of the lens group 200 is within the predetermined value, the process moves to the next process as is. However, when the tilt exceeds the predetermined value, the flat spacer 30 is exchanged with the tilt spacer 31 to adjust the tilt of the interchangeable lens 100.

Figure 5A:
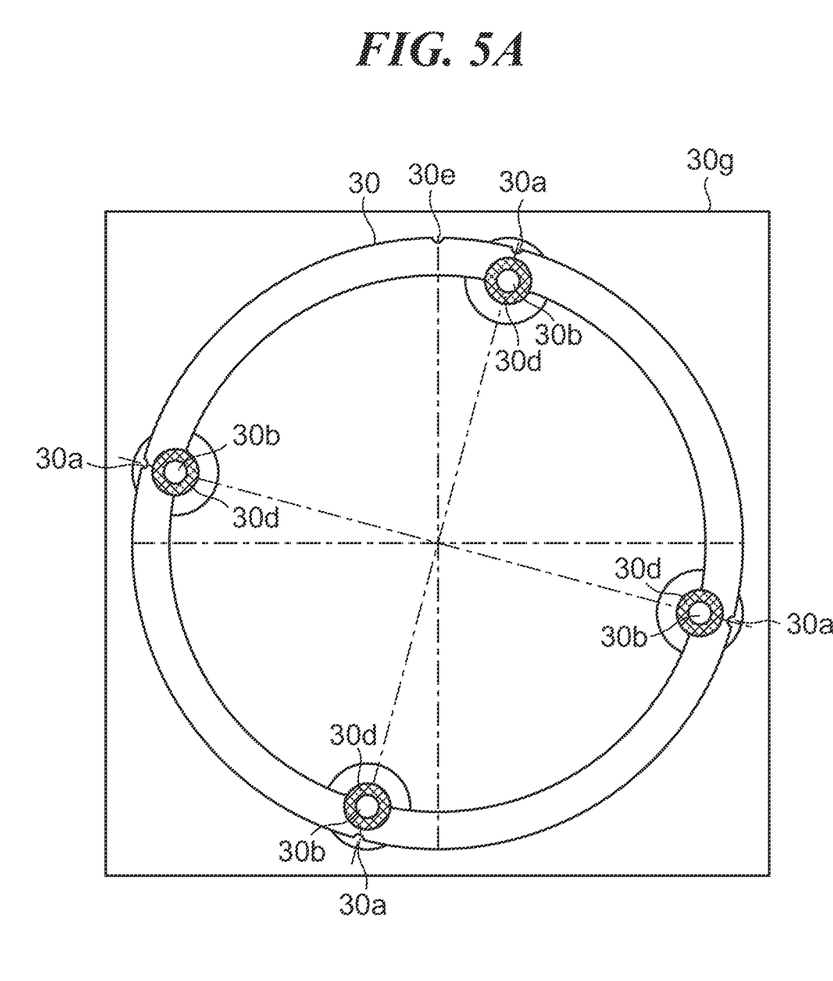
FIGS. 5A and 5B are conceptual views of a flat spacer.
Figure 5B:
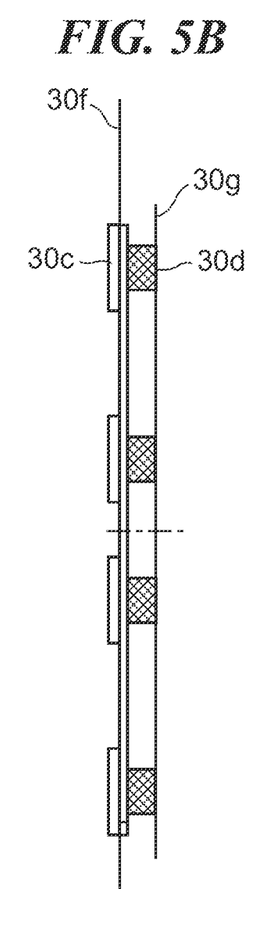
Figure 6:
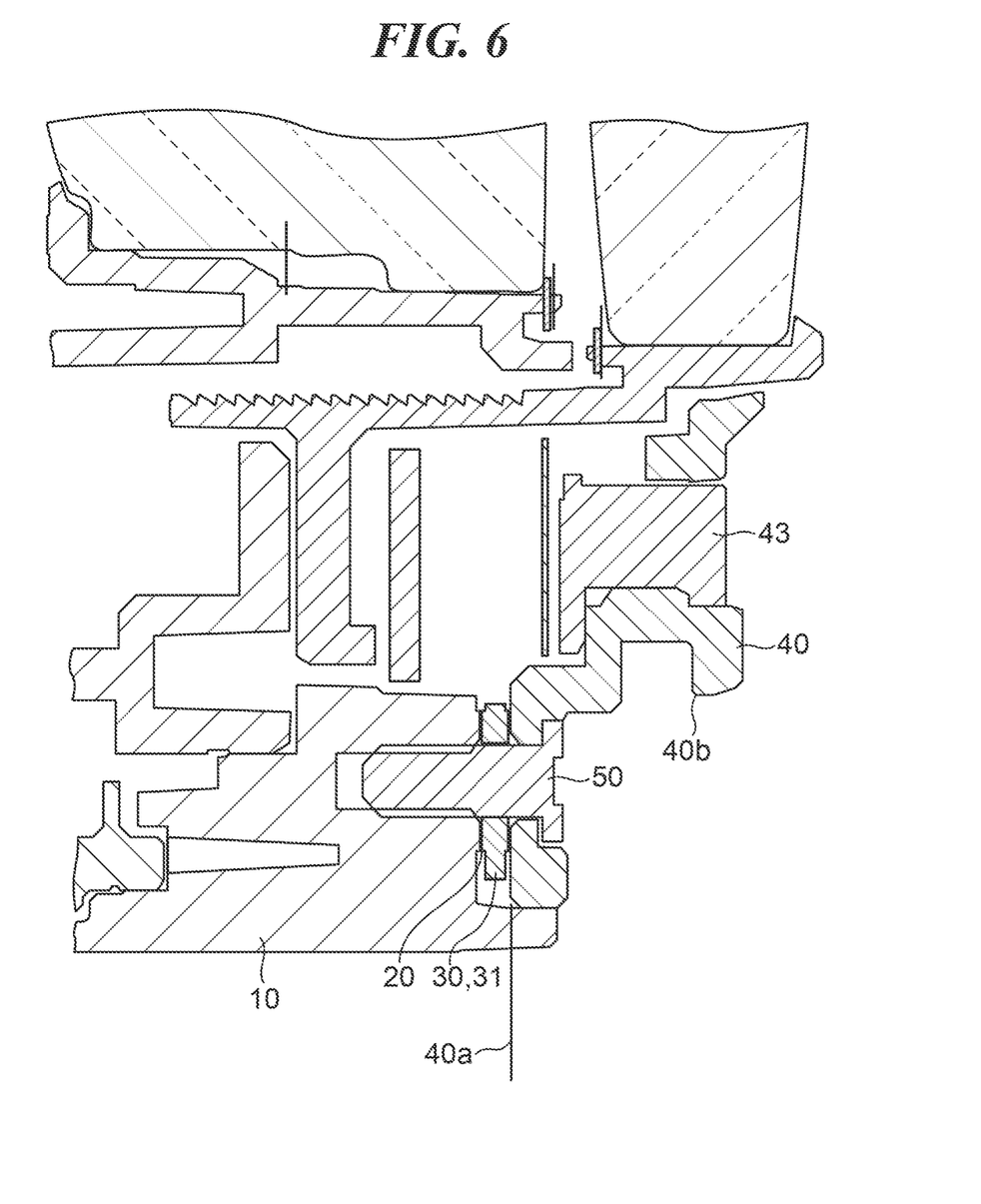
FIG. 6 is an enlarged cross-sectional view showing the vicinity of the lens mount of the interchangeable lens.

In this regard, configurations of the flat spacer 30 and the tilt spacer 31 will be described with reference to FIG. 2 and FIGS. 5A to 7B. FIG. 5A is a conceptual view showing the flat spacer 30 viewed from the optical axis direction, and FIG. 5B is a conceptual view viewed from a side surface in FIG. 5A. FIG. 6 is an enlarged cross-sectional view showing the vicinity of the mount 40 of the interchangeable lens 100.

First, the flat spacer 30 will be described. As shown in FIG. 2, and FIGS. 5A and 5B, the flat spacer 30 is provided with the reception surfaces 10b of the fixed barrel 10, and the through-holes 30b at the same phases as the through-holes 40c of the mount 40. The through-holes 30b protrude substantially in parallel to the optical axis and is formed to penetrate the centers of barrel portions, and reception surfaces 30d which come into contact with the mount 40 are provided coaxially with the through-holes 30b on distal end surfaces of the barrel portions. It should be noted that FIGS. 5A and 5B show the exaggerated height of the barrel portion for ease of illustration, and the flat spacer 30 is sandwiched in the optical axis direction by fastening of the screws 50.

The reception surfaces 30c which come into contact with the reception surfaces 10b of the fixed barrel 10 are coaxially provided with the through-holes 30b via the mount seat 20 on a side opposite to the reception surfaces 30d of the flat spacer 30. Furthermore, the flat spacer 30 is provided with a mark 30e in an assembly direction, and the positioning portions 30a for the fixed barrel 10.

The reception surfaces 10b of the fixed barrel 10 are provided in a direction perpendicular to the optical axis x as described above. Therefore, when the flat spacer 30 is assembled in the interchangeable lens 100, the reception surfaces 10b of the fixed barrel 10 and the contact surface 40a of the mount 40 become substantially parallel to each other (see FIG. 6).

The mark 30e is formed at one portion, and both of the reception surfaces 30c and the reception surfaces 30d are provided at four portions at substantially regular intervals in the circumferential direction and disposed in parallel at regular intervals in the optical axis direction as described above. Furthermore, the positioning portions 30a and the through-holes 30b are likewise formed at four portions at substantially regular intervals in the circumferential direction.

Hence, the flat spacer 30 is positioned with respect to the fixed barrel 10 by aligning the positioning portions 30a and the positioning portions 10a of the fixed barrel 10. However, the flat spacer 30 can be rotated for every 90 degrees and assembled, so that in which direction the flat spacer 30 is assembled can be determined based on the mark 30e.

Figure 7A:
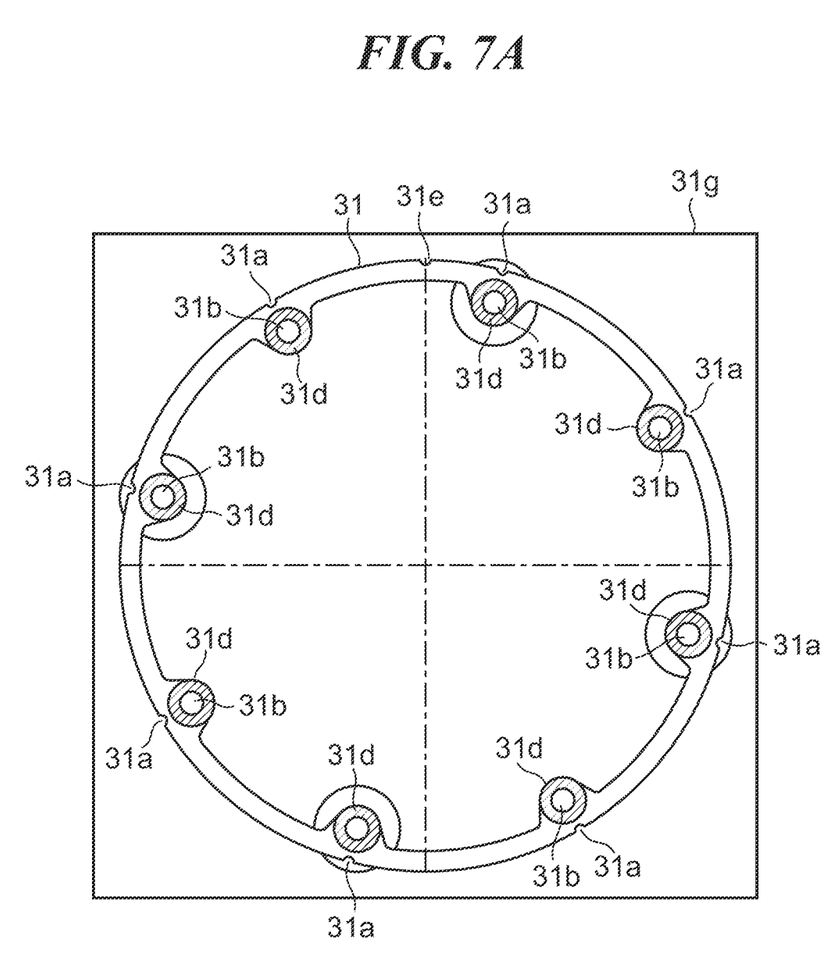
FIGS. 7A and 7B are conceptual views of a tilt spacer.

Next, the configuration of the tilt spacer 31 will be described with reference to FIG. 2, and FIGS. 7A and 7B. FIG. 7A is a conceptual view showing the tilt spacer 31 viewed from the optical axis direction, and FIG. 7B is a conceptual view viewed from a side surface in FIG. 7A.

Figure 7B:
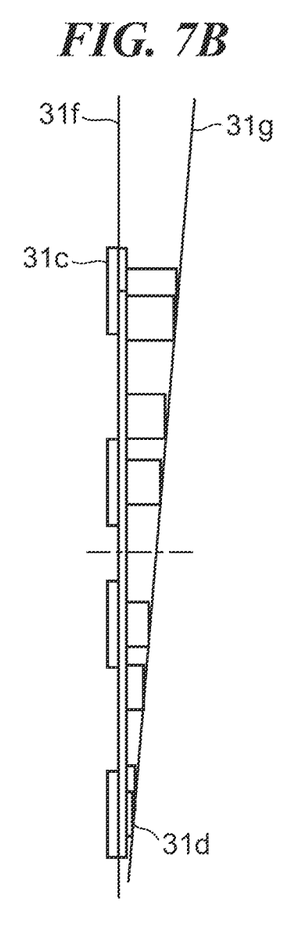

As shown in FIG. 2, and FIGS. 7A and 7B, as described above, the tilt spacer 31 is provided with the through-holes 31b at eight portions in total including four portions at the same phases as the screw holes 10c of the fixed barrel 10 and the through-holes 40c of the mount 40, and four portions of positions with the phases shifted by 45 degrees from the screw holes 10c. In this regard, the through-holes 31b at the eight portions in total protrude in parallel to the optical axis, and are formed penetrating the centers of the barrel portions of the different heights in the optical axis direction. The reception surfaces 31d which come into contact with the mount 40 are coaxially provided with the through-holes 31b on the distal end surface of each barrel part. It should be noted that FIGS. 7A and 7B show the exaggerated height of the barrel part, and the tilt spacer 31 is sandwiched in the optical axis direction by fastening of the screws 50, and an arc-shaped portion which connects the seat surface and the seat surface elastically deforms.

The reception surfaces 31c which come into contact with the reception surfaces 10b of the fixed barrel 10 are coaxially provided with the through-holes 31b via the mount seat 20 on a side opposite to the reception surfaces 31d of the tilt spacer 31. Thus, in the present embodiment, the reception surfaces 31c and the reception surfaces 31d are disposed substantially in parallel to each other. However, according to the arrangement relationship of the screws 50, each of the reception surfaces 31d has the different height, and each reception surface 31c is disposed on a plane substantially perpendicular to the optical axis. Furthermore, the tilt spacer 31 is provided the positioning portions 31a for the fixed barrel 10, and a mark 31e in the assembly direction.

The through-holes 31b of the tilt spacer 31 are provided at eight portions in total including four portions at the same phases as the screw holes 10c (screws 50) and four portions of positions with the phases shifted by 45 degrees in the circumferential direction, and the positioning portions 31a for the fixed barrel 10 are also provided at eight portions. Hence, the tilt spacer 31 can be rotated for every 45 degrees in the circumferential direction about the optical axis x and assembled, and in which direction the tilt spacer 31 is assembled can be determined based on the mark 31e formed at one portion.

Furthermore, an angle 31h, calculated by optical design, which is necessary for overall tilt adjustment is formed between a virtual plane 31g defined by the reception surface 31d and a virtual plane 31f defined by the reception surface 31c. Consequently, by rotating the tilt spacer 31 for every 45 degrees in the circumferential direction about the optical axis x, the virtual plane 31g defined by the reception surface 31d can be rotated for every 45 degrees in the circumferential direction about the optical axis x toward any of the directions.

Hence, the tilt spacer 31 is assembled in a tilt direction obtained from the measurement result of the tilt adjuster, and is positioned with respect to the fixed barrel 10, so that the entire interchangeable lens 100 tilts by an angle 31h with respect to the contact surface 40a of the mount 40 toward the direction calculated by the tilt adjuster (FIG. 4). Thus, the tilts of the image sensor and the lens group 200 are adjusted within the predetermined values. Thus, by exchanging the flat spacer 30 with the tilt spacer 31, and assembling the tilt spacer 31 in the tilt direction obtained by the tilt adjuster, it is possible to adjust the tilt.

As described above, the present embodiment can provide the interchangeable lens 100 which can easily perform the back focus adjustment and the optical axis tilt adjustment, and the camera system which includes the interchangeable lens 100.

It should be noted that, in the present embodiment, the barrel portions on which the reception surfaces 31d are formed all have the different heights according to the arrangement relationship of the screws 50, yet may partially have the same height if the virtual plane 31g can be formed.

Second Embodiment

Next, an interchangeable lens according to the second embodiment of the present invention will be described with reference to FIGS. 8A to 9B. The present embodiment will describe an example of a case where a tilt spacer 32 is used instead of a tilt spacer 31 according to the above first embodiment. Hence, components which overlap those of the above first embodiment will be described by appropriating the drawing and the reference numerals.

Figures 8A, 8B:
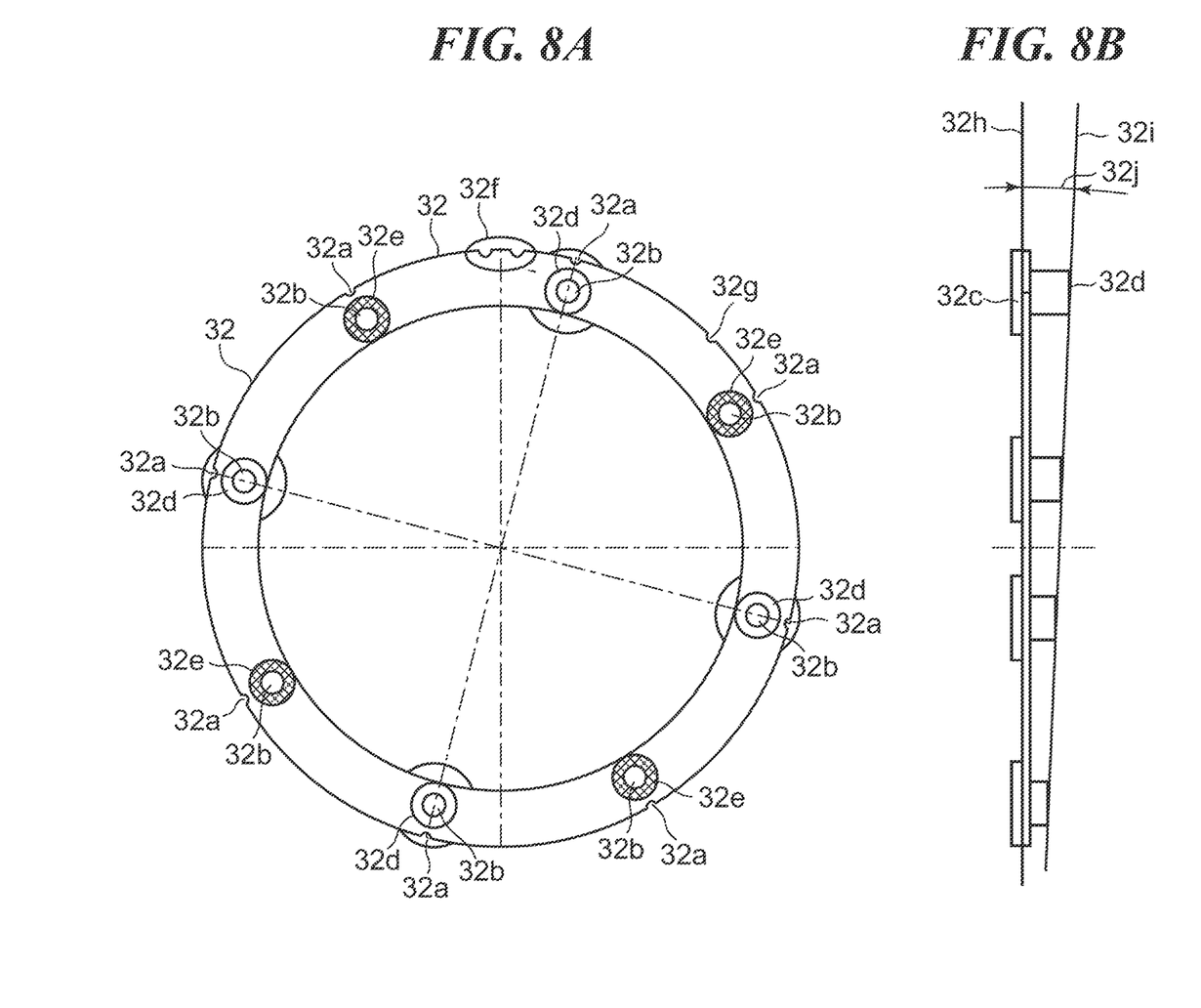
FIGS. 8A and 8B are conceptual views showing a first assembly state of the tilt spacer in the interchangeable lens according to a second embodiment of the present invention.
Figure 9A:
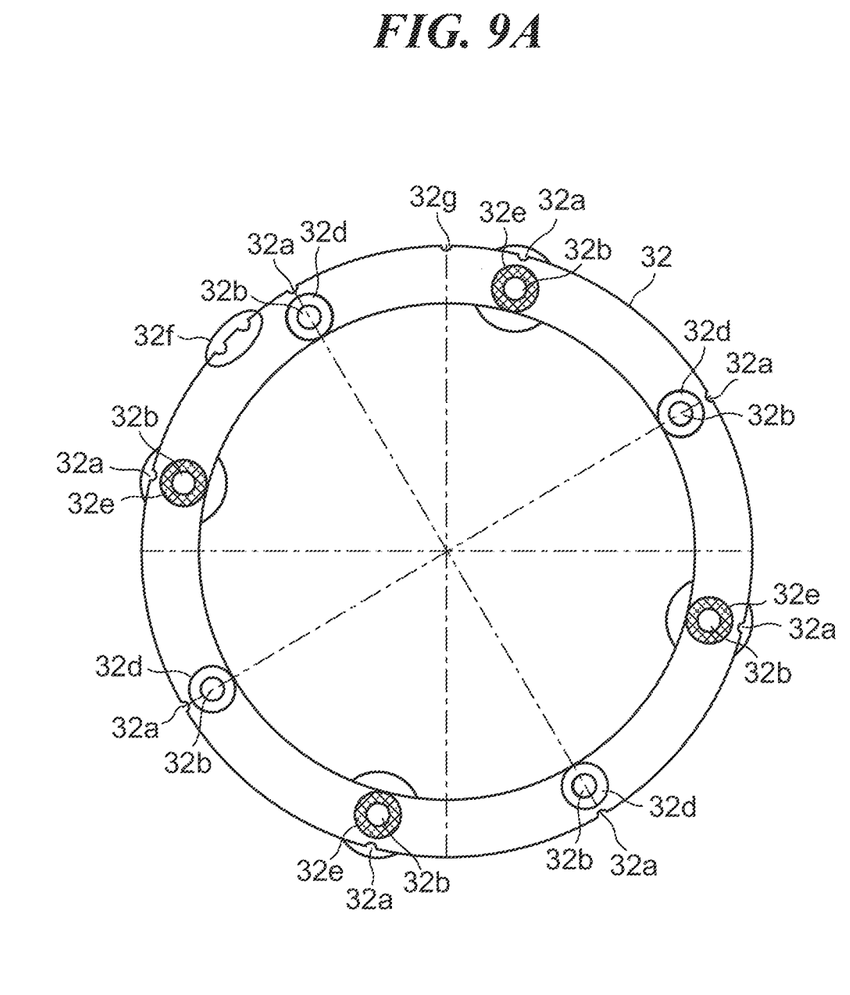
FIGS. 9A and 9B are conceptual views showing a second assembly state of the tilt spacer.
Figure 9B:
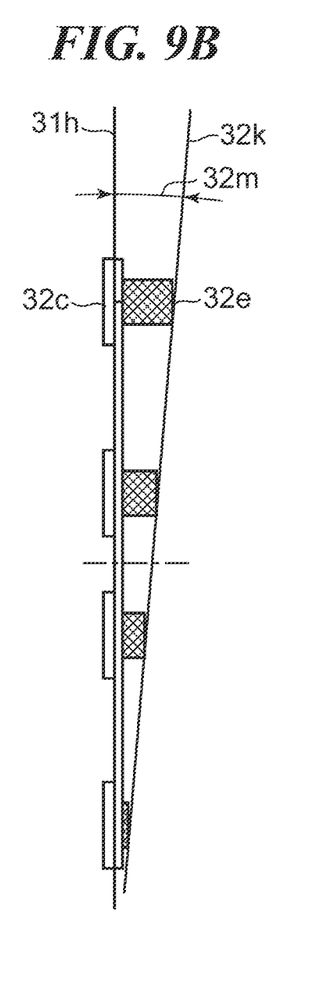

FIG. 8A is a conceptual diagram showing a first assembly state of the tilt spacer 32 used for overall tilt adjustment of the interchangeable lens 100 from an optical axis direction, and FIG. 8B is a conceptual diagram seen from a side surface of FIG. 8A. FIG. 9A is a conceptual diagram showing a second assembly state of the tilt spacer 32 from the optical axis direction, and FIG. 9B is a schematic side cross-sectional view seen from a side surface of FIG. 9A.

As shown in FIGS. 8A to 9B, the tilt spacer 32 is provided with the through-holes 32b at eight portions in total including four portions at the same phases as screw holes 10c of a fixed barrel 10 and through-holes 40c of a mount 40, and four portions of positions with the phases shifted by 45 degrees from the screw holes 10c. In this regard, similar to through-holes 31b, the through-holes 32b at the eight portions in total protrude in parallel to the optical axis, and are formed penetrating the centers of the barrel portions of the different heights in the optical axis direction.

Furthermore, reception surfaces 32d and 32e which come into contact with the mount 40 are coaxially provided with the through-holes 32b on the distal end surface of each barrel part. Furthermore, barrel portions on which the reception surfaces 32d are formed and barrel portions on which the reception surfaces 32e are formed also have the different heights in the optical axis direction, and the reception surfaces 32d and the reception surfaces 32e are alternately disposed in a circumferential direction. Furthermore, the number of sets of the reception surfaces 32d and 32e is a multiple of the number of the screw holes 10c (screws 50). It should be noted that FIG. 8A to 9B show the exaggerated height of the barrel part, and the tilt spacer 32 is sandwiched in the optical axis direction by fastening of the screws 50, and an arc-shaped portion which connects the seat surface and the seat surface elastically deforms.

The reception surfaces 32c which come into contact with the reception surfaces 10b of the fixed barrel 10 are disposed coaxially with the through-holes 32b via the mount seat 20 on a side opposite to the reception surfaces 32d and 32e of the tilt spacer 32. Thus, in the present embodiment, the reception surfaces 32c and the reception surfaces 32d and 32e are disposed in substantially in parallel to each other. However, according to an arrangement relationship of the screws 50 makes intervals between the reception surfaces 32c and each of the reception surfaces 32d and 32e different, and also makes the heights of the reception surface 32d and the reception surface 32e different. The reception surfaces 32c are disposed on a plane substantially perpendicular to the optical axis.

That is, the reception surfaces 32c and the reception surfaces 32d and 32e are disposed substantially in parallel to each other in the optical axis direction. However, according to the arrangement relationship of the screws 50, the reception surfaces 32d and 32e are disposed at the different heights, and further, the intervals in the optical axis direction between the reception surfaces 32c and the reception surfaces 32d, and the intervals in the optical axis direction between the reception surfaces 32c and the reception surfaces 32e differ from each other. Furthermore, the tilt spacer 32 is provided with positioning portions 32a for the fixed barrel 10 at the same phases as the through-holes 32b, and with a mark 32g at one portion and marks 32f at two portions in the assembly direction.

In this regard, a virtual plane 32i (FIGS. 8A and 8B) defined by the reception surfaces 32d, and a virtual plane 32k (FIGS. 9A and 9B) defined by the reception surfaces 32e have angles 32j and 32m, calculated by optical design, which are necessary for overall tilt adjustment with respect to a virtual plane 32h defined by the reception surfaces 32c. Furthermore, an assembly mark of the reception surfaces 32d and the virtual plane 32i is a mark 32f, and an assembly mark of the reception surfaces 32e and the virtual plane 32k is a mark 32g.

Consequently, by rotating the tilt spacer 32 for every 90 degrees in the circumferential direction about the optical axis x based on the mark 32f, a virtual plane 32i defined by the reception surface 32d can be rotated for every 90 degrees in the circumferential direction about the optical axis x toward any of the directions. Furthermore, similarly, by rotating the tilt spacer 32 per 90 degree in the circumferential direction about the optical axis x based on the mark 32g, a virtual plane 32k defined by the reception surface 32e can be rotated per 90 degree in the circumferential direction about the optical axis x toward any of the directions.

Thus, by assembling the tilt spacer 32 in the fixed barrel 10 based on the mark 32f and the mark 32g, it is possible to rotate the virtual plane 32i and the virtual plane 32k for every 90 degrees in the circumferential direction about the optical axis x toward any of the directions and perform tilt adjustment by the angle 32j and the angle 32m. Thus, by assembling the tilt spacer 32 in a tilt direction obtained from the measurement result of the tilt adjuster and positioning the tilt spacer 32 with respect to the fixed barrel 10, the tilt can be adjusted, so that tilts of the image sensor and the lens group 200 are adjusted within predetermined values.

It should be noted that, in the present embodiment, the barrel portions on which the reception surfaces 32d and 32e are formed all have the different heights according to the arrangement relationship of the screws 50, yet may partially have the same height if the virtual plane 32i and the virtual plane 32k can be formed.

Furthermore, in the present embodiment, the angles 32j and 32m are formed between the virtual plane 32h and the virtual planes 32i and 32k. However, one of the virtual plane 32i and the virtual plane 32k may be formed in parallel to the virtual plane 32h. By so doing, one spacer can be shared for both of the flat spacer and the tilt spacer.

Furthermore, in the present embodiment, two patterns of the reception surfaces 32d and the reception surfaces 32e are provided. However, three patterns or more may be provided depending on the tilt adjustment range.

As described above, in the present embodiment, by exchanging a flat spacer 30 with the tilt spacer 32, and assembling the tilt spacer 32 in the tilt direction obtained by the tilt adjuster, it is possible to perform two patterns of tilt adjustment. The other configurations, functions and effects are the same as those of the above first embodiment.

While the present invention has been described with reference to exemplary embodiments, it is to be understood that the invention is not limited to the disclosed exemplary embodiments. The materials, the shapes, the dimensions, the forms, the numbers and the arrangement portions can be optionally changed without departing from the gist of the present invention.

This application claims the benefit of Japanese Patent Application No. 2018-013809, filed Jan. 30, 2018, which is hereby incorporated by reference wherein in its entirety.

What is claimed is:

1. An interchangeable lens comprising:
   a lens barrel portion configured to hold a lens group;
   a lens mount detachably coupled to a camera main body; and
   a spacer sandwiched between the lens barrel portion and the lens mount in an optical axis direction of the interchangeable lens,
   wherein the spacer having, in a circumferential direction of the interchangeable lens, a plurality of first seat surfaces protruding in the optical axis direction, respectively, at one surface thereof with respect to the optical axis direction, and having, in the circumferential direction, a plurality of second seat surfaces protruding in the optical axis direction, respectively, at the other surface thereof with respect to the optical axis direction, and
   one plurality of seat surfaces of the plurality of first seat surfaces and the plurality of second seat surfaces are disposed with different heights in the optical axis direction such that a surface defined by the plurality of second seat surfaces has an angle with respect to a surface defined by the plurality of first seat surfaces.

2. The interchangeable lens according to claim 1, wherein the first seat surfaces and the second seat surfaces are substantially in parallel to each other in the optical axis direction, and a surface defined by the other plurality of seat surfaces of the plurality of first seat surfaces and the plurality of second seat surfaces is disposed along a plane substantially perpendicular to an optical axis of the interchangeable lens.

3. The interchangeable lens according to claim 1, wherein the one plurality of seat surfaces of the plurality of first seat surfaces and the plurality of second seat surfaces includes seat surfaces of the same height.

4. The interchangeable lens according to claim 1, wherein the spacer is sandwiched rotatably about the optical axis with respect to the lens barrel portion.

5. The interchangeable lens according to claim 1, wherein the lens barrel portion and the lens mount are fastened in the optical axis direction by a plurality of screws disposed in the circumferential direction via the spacer.

6. The interchangeable lens according to claim 1, wherein the number of sets of the first and second seat surfaces is a multiple of the number of the plurality of screws.

7. The interchangeable lens according to claim 1, wherein the one plurality of seat surfaces of the plurality of first seat surfaces and the plurality of second seat surfaces include seat surfaces having the same height alternately in the circumferential direction.

8. A camera system comprising a camera main body; and an interchangeable lens detachably attached to the camera main body,
   wherein the camera system comprises the interchangeable lens according to claim 1 as the interchangeable lens.

* * * * *